United States Patent [19]

Crofts et al.

[11] Patent Number: 4,807,081
[45] Date of Patent: Feb. 21, 1989

[54] CIRCUIT PROTECTION ARRANGEMENT

[75] Inventors: David Crofts, Somerford Keynes; Martin A. Wright, Swindon, both of England

[73] Assignee: Raychem Limited, United Kingdom

[21] Appl. No.: 92,832

[22] Filed: Sep. 3, 1987

[30] Foreign Application Priority Data

Sep. 5, 1986 [GB] United Kingdom ............... 8621431

[51] Int. Cl.$^4$ ............................................. H02H 3/20
[52] U.S. Cl. ........................................ 361/56; 361/91; 361/111; 361/117
[58] Field of Search ................... 361/56, 91, 110, 111, 361/112, 117, 118, 119, 120, 126, 127, 137

[56] References Cited

U.S. PATENT DOCUMENTS

| | | | |
|---|---|---|---|
| 3,343,085 | 9/1967 | Oushinsky | 361/117 X |
| 3,558,830 | 1/1971 | Bender | 361/91 X |
| 4,023,071 | 5/1977 | Fussell | 361/120 X |
| 4,212,045 | 7/1980 | Mortzloff | 361/127 |
| 4,271,446 | 6/1981 | Comstock | 361/56 |
| 4,326,232 | 4/1982 | Nishiwaki et al. | 361/127 |
| 4,390,919 | 6/1983 | Leniski | 361/56 |
| 4,463,406 | 7/1984 | Sirel | 361/56 |
| 4,571,656 | 2/1986 | Ruckman | 361/56 |
| 4,586,104 | 4/1986 | Standler | 361/119 X |

FOREIGN PATENT DOCUMENTS

| | | |
|---|---|---|
| 19884 | 12/1980 | European Pat. Off. . |
| 50966 | 5/1982 | European Pat. Off. . |
| 72146 | 2/1983 | European Pat. Off. . |
| 1437387 | 11/1968 | Fed. Rep. of Germany . |
| 2,327,675 | 5/1977 | France .............. 361/56 |
| 350743 | 6/1931 | United Kingdom . |
| 525137 | 8/1940 | United Kingdom . |
| 800252 | 8/1958 | United Kingdom . |
| 1038050 | 8/1966 | United Kingdom . |
| 1060172 | 3/1967 | United Kingdom . |
| 1133750 | 11/1968 | United Kingdom . |
| 1412036 | 10/1975 | United Kingdom . |
| 1412158 | 10/1975 | United Kingdom . |
| 2021857 | 12/1979 | United Kingdom . |
| 2040120 | 8/1980 | United Kingdom . |
| 1586235 | 3/1981 | United Kingdom . |
| 2094078 | 9/1982 | United Kingdom . |
| 960667 | 6/1984 | United Kingdom . |

OTHER PUBLICATIONS

"Electric field Induced Memory Switching in thin Films of Chalcogenide System Ge-As-Se" by Pinto et al. 7-1971.

"Physics of Disordered Materials" Ed. by Adler, Fritzuche and Ovshinsky 1985 pp. 779-791.

Primary Examiner—Roy N. Envall, Jr.
Assistant Examiner—Derek S. Jennings
Attorney, Agent, or Firm—Bernard J. Lyons; Herbert G. Burkard

[57] ABSTRACT

An arrangement for protecting an electrical circuit from a voltage transient having a fast rise time, e.g. in the order of 20 Vns$^{-1}$ comprises a number of semiconductive threshold foldback switching elements preferably formed from a chalcogenide glass, in parallel with one another between the current carrying line of the circuit and earth. An additional, non-linear, circuit protection device is connected in parallel with the switching element between the current carrying line and earth, in order to pass high frequency components of the transient to earth.

17 Claims, 3 Drawing Sheets a SWITCH TIME
b DELAY TIME
c FOLDBACK TIME

CIRCUIT PROTECTION ARRANGEMENT

FIELD OF THE INVENTION

This invention relates to the protection of electrical circuits from voltage transients, and especially to the protection of circuits from voltage transients that are associated with an electromagnetic pulse.

BACKGROUND OF THE INVENTION

Electromagnetic pulses can induce very high currents and voltages on cables and structures such as aeroplanes and ships, which can penetrate the electrical systems and damage them, either causing hardware damage such as semiconductor burnout, or electronic upset, e.g. transmission loss or loss of stored data. As semiconductor technology advances, the energy needed to cause such damage becomes less.

The most severe threat to electrical and electronic equipment is the electromagnetic pulse due to detonation of a nuclear device which can generate large voltage or current spikes with very short rise times. The exact characteristics of the pulse are complicated although a typical pulse will exhibit a field strength of about $10^5 \text{ Vm}^{-1}$ with an accompanying H field intensity of 130 $\text{Am}^{-1}$ (based on free space impedance of 377 ohms), a pulse width of a few microseconds and a rise time of a few nanoseconds. In general damaging amplitudes in the pulse occur within the frequency range of 10 KHz to 100 MHz.

In many circumstances it may be necessary to protect equipment from voltage transients other than those due to nuclear detonation. For example, although lightning is not normally associated with transients having such short rise times, it has recently been considered that certain components in lightning transients may, in fact, exhibit very short rise times and so may not be removed by conventional surge arrestors.

DESCRIPTION OF PRIOR ART

It has been proposed to use certain materials, for example certain chalcogenide glasses, in the formation of devices for protecting electrical circuits from voltage transients, for example as described in U.S. Pat. Nos. 3,271,591 and 3,343,034 to Ovshinsky and, 3,436,601 to Dyre, the disclosures of which are incorporated herein by reference. Some of these chalcogenide glasses may be used to form "foldback" devices, by which is meant that the device will change from a high resistance state to a low resistance state on application of a voltage above a critical value that depends on the device. Of particular interest are "threshold" foldback devices, by which is meant devices that will change from a high resistance state to a low resistance state on application of a high voltage, called the threshold voltage, but which will remain in their low resistance state only for as long as a small "holding" current is maintained.

Based on the electrical characteristics of the pulse and the nature of the equipment it is intended to protect, it is possible to determine what characteristics of a circuit protection device are necessary for it to be able successfully to protect the circuit against the pulse damage. For example, one set of guidelines published by H. R. Philipp and L. M. Levinson in J. Appl Phys 52(2) February 1981 pp. 1083 to 1090, the disclosure of which is incorporated herein by reference, specifies inter alia the following requirements for a surge arrestor material that is intended to short a voltage transient to earth:

Threshold voltage 100 V
Switching delay time <1 nanosecond
Insertion loss <0.4 dB at 0 to 200 MHz <0.8 dB at 200 to 500 MHz Certain threshold switching devices that may be used to protect certain electrical circuits from such voltage transients are described in our copending European Patent Application No. 86302325.5 (Ser. No. 196,891) (corresponding to U.S. application Ser. No. 845,652) the disclosure of which is incorporated herein by reference. Such switches are highly effective at protecting many forms of electrical circuit from voltage transients caused for example by the electromagnetic pulse where the induced current will be up to about 100 amps. However, in some cases larger currents will be expected. For example, extensive systems such as telephone lines above ground and power lines can couple very high currents from EMP type fields. The exact wave forms are very complicated, but they are described in the paper given by Gallon, "EMP Coupling to Long Cables" (EMC 79). Currents of above a thousand amps rising in time periods of a few nanoseconds are predicted and these transients will cause considerable damage to electronic systems. In such cases it has been found that the switches described in our copending application do not possess sufficient current carrying capacity to protect the circuit. Furthermore, it appears that the materials used in such switches cannot be extended in order to improve their current carrying capacity.

The mechanism of the change of resistance of the material when subjected to a voltage transient has recently been summarised in a text book on the "Physics of Disordered Materials" edited by Adler, Fritzche and Ovshinsky, pages 779 to 810. The generally accepted theory is that when a critical electric field strength across the switch is reached, traps within the material are filled and the material can conduct. It is likely that a filament would be formed of the highly conducting material and the diameter of the filament would increase with increasing current. It is often stated in the literature (Adler J. of Appl. Physics Vol. 51 June 1980) that the peak current density is about 200A $\text{mm}^{-2}$ for materials of this type. However, since the switching material is thin (between 1 and 100 micrometres) it is difficult for the filament to grow fast enough in diameter to allow very high currents to flow. Typically when 100 amp per switch is exceeded, regardless of switch area, the power causes local overheating and the switch fails.

The circumstances in an actual device operated under normal conditions as understood in the current literature are described by Peterson and Adler (J. Appl. Phys. 47:256 (1976)) who found that for currents up to 200 mA (carried by a contact area of 25 $\mu$m diameter) the estimated filament radius increased with currents in such a way as to keep the current density constant. We have carried out work with currents up to 100 amps on larger switch areas to evaluate the effect of maximum current density. We have found that when a pulse is applied containing 50 amps to the glass material (using contact electrodes of 0.25 $\text{mm}^{-2}$) failure of the device occurs. (Current density 200 amp $\text{mm}^{-2}$) but a current of 25 amps can be passed (current density 100 amp $\text{mm}^{-2}$). With large electrode areas, i.e. 5 $\text{mm}^2$ we find that currents of 100 amps can be passed, but above this level switches again fail. These experiments were carried out using fast rise time pulses (5 nanoseconds) and we believe that the filament radial growth is limited and cannot keep pace with the rate of current increase.

The effect of connecting a number of identical threshold switching elements in parallel has been considered in the reference "Physics of Disordered Materials" (mentioned above) p. 784 which states that in such a case only one switch will fire i.e. will switch to its low resistance state. Once the first switch has fired or switched the voltage across that switch, and therefore across all the other switches, is immediately reduced so as to prevent any other switch firing.

SUMMARY OF THE INVENTION

We have found that while this statement is correct in most circumstances, it is quite incorrect where voltage transients having very fast rise times are concerned, and that in such circumstances it is quite possible for all the switching elements to switch when a transient is experienced. The speed at which the transient voltage rises will depend on a number of factors including the cause of the transient, the length of the line in which the transient current is induced, and the source impedance of the circuit, and in some cases, for example in the case of an extended line that is subjected to the electromagnetic pulse of a nuclear device, the transient may have a leading edge that rises at up to 200 $Vns^{-1}$ or even faster. We have found that where the transient has a leading edge that rises at a rate of at least 20 $Vns^{-1}$, which we call herein transients "having a fast rise time", all, or substantially all, the switching elements can be caused to fire.

Thus, according to one aspect the invention provides an arrangement for protecting an electrical circuit from a voltage transient having a fast rise time, which comprises a plurality of semiconductor threshold foldback switching elements that are connected, or arranged to be connected, in parallel with one another between a current carrying line of the circuit and earth, and a capacitor connected in series with each switching element.

DESCRIPTION OF THE INVENTION

Using a number of chalcogenide glass threshold switches we have been able to study and develop designs to understand the nature of the actual switch mechanism. A typical electromagnetic pulse shape is shown in FIG. 1 and the voltage across a chalcogenide glass threshold switching element is shown in FIG. 2. With such materials it has been found that with very fast rise time voltage transients, three regions of switching occur. The first region a is the region during which the switching element begins to switch. The speed of the threshold switch can be determined by measuring the peak voltage across the switch using pulses of increasing rates of the increase of voltage. For example if a pulse is used that rises slowly, for example rising significantly less than 20 volts per nanosecond a threshold voltage of about 100 volts may be observed. If then a faster pulse is applied to the switch, for example a pulse having a leading edge that rises at 200 $Vns^{-1}$ a peak voltage across the switch of about 140 V will be observed. The overvoltage occurs because of the finite time the switching element takes to begin to switch. At a rate of 200 $Vns^{-1}$, and overvoltage of 40 V would indicate a period of 200 picoseconds for this region of the switching process. In general this region takes from 100 to 1000 picoseconds. The second region b, known as the "delay time" or "delay period" is a region during which the voltage across the switch no longer rises and may fall back to the threshold voltage of the switch. This period may last from 1 to 5 nanoseconds. The third region c called the "fold back" region is the region during which the voltage across the switch falls to a very low voltage. The period during which this occurs is typically in the order of from 2 to 20 nanoseconds.

The mechanism by which switching in such materials occurs is not fully understood, nor is there complete agreement about the mechanism. However, we believe that the initial switching during period a of FIG. 2 occurs by an electronic mechanism in which traps within the material are filled, as mentioned above, to form a conductive filament, and that during the delay period b thermal effects caused by Joule heating within the switching element take control causing the element to fold back in period c.

The reason why the switches in the arrangement according to the present invention can be made to switch is even less well understood, especially when it is appreciated that different switches may have threshold voltages that differ from one another by up to 80V and often by up to 40V. It is considered that the ability of the arrangement according to the invention to be able to operate in its intended fashion is due to three electrical properties of the switches: First, the existance of a significant overvoltage while the first switching element begins to switch. It is this overvoltage that causes the voltage across the remaining switches to exceed the threshold voltage of those switches even though the switch having the lowest threshold voltage has begun to switch. Secondly, the existence of a delay time during which a voltage across the switches in the order of their threshold voltage is maintained. This delay time would appear to be necessary in order for the switches having the higher threshold voltages to receive sufficient electrical energy to undergo irreversible switching, that is to say, to change into a state such that they will subsequently "fold back" even if the electrical energy were immediately cut off. Thirdly, the fact that the point at which any switching element "irreversibly" switches is not associated with the voltage reduction at the beginning of the fold back region c. Although it is not clear at precisely what point in the latching region b the switching of any switch has become irreversible (so that fold back inevitably follows) it appears that this occurs, and must occur in order for the arrangement according to the invention to function, at some significant time period before the onset of the fold back region c. If, as had been considered, the switching only became irreversible at the commencement of the fold back region c, then the voltage reduction across the switches associated with the folding back of the first switch to fold back would cause the remaining switches to revert to their high resistance state.

Preferably the materials that are used to form the switching elements exhibit a switching speed, i.e. time taken initially to clamp, of not more than 1 nanosecond preferably less than 500 picoseconds but preferably more than 50 picoseconds and especially more than 100 picoseconds. The material also preferably exhibits a delay time before fold back of at least 1 nanosecond more preferably at least 2 nanoseconds but preferably not more than 10 nanoseconds and especially not more than 6 nanoseconds.

We have found that the switching elements need not all be identical in order for them all to fire. Even if the switches are all formed from the same nominal composition, their threshold switching voltages may, and usually will, differ by a significant amount. However this variation in the threshold switching voltage between different switches does not appear to prevent all the switches firing when the circuit experiences a fast rise time transient such as associated with an electromagnetic pulse. The rate at which the pulse must rise in order to cause all the switching elements to fire will depend principally on the difference in the threshold voltages of the switching elements, the greater the difference, the greater the rate at which the pulse must rise.

The purpose of the capacitor is to prevent the normal direct currents that may occur in the circuit holding the switching elements in their low resistance state indefinitely once the transient has passed. In addition, very low frequency alternating currents may hold the elements in their low resistance state for sufficient time for the material to "latch" i.e. to adopt memory characteristics and thereby cause the device to remain permanently in its low resistance state.

The required capacitance of the capacitor will depend on a number of factors including the material from which the switching element is formed, the nature, of the transient against which protection is desired, the intended use of the circuit and the number of capacitors that are employed in the arrangement. For protection against a nuclear electromagnetic pulse, the capacitance will normally be at least 30, and preferably at least 100 nanofarads. A capacitor of this size will allow all transients having a frequency spectrum above about 1 MHz to pass to earth and so allow the device to protect the circuit from the transient. In one form of arrangement according to the invention a separate capacitor may be connected in series to each switching element (either between the element and the line or between the element and earth), in which case the capacitors each preferably have a capacitance of not more than 2, more preferably not more than 1, and especially not more than 0.5 microfarads. The use of a capacitor of this size has the advantage that the switching device is itself protected by the capacitor against damage by low frequency components of the transient. On the basis of observations made, it appears that certain forms of threshold switching elements may require less electrical energy to latch them in their low resistance state at low electrical frequencies (e.g. less than 100 KHz) than at higher frequencies. Thus, many devices that exhibit acceptable energies to latch at frequencies of about 10 MHz would, in fact, latch in their low resistance state when subjected to a voltage transient due to the low frequency components of the transient if no such capacitor were provided. Any such low frequency components of the transient that are not passed to earth by the switch can easily be filtered out of the electrical circuit by conventional means with no loss to the signal carried by the circuit.

In an alternative arrangement, a single capacitor may be connected in series with all the switching elements. In this arrangement the capacitor preferably has a capacitance of not more than 2, preferably not more than 1, and especially not more than 0.5 microfarads per switching element, up to a value of 10, and especially 5 microfarads.

The switching material is preferably formed from an amorphous composition based on selenium, arsenic and germanium.

The preferred compositions preferably comprise:
(a) 15 to 75 atomic % selenium;
(b) 10 to 65 atomic % arsenic; and
(c) 5 to 42 atomic % germanium or, if the composition contains less than 35 atomic % selenium, 5 to 35 atomic % germanium in which the proportions of (a), (b) and (c) based on the total molar quantity of (a), (b) and (c)) add up to 100%.

Preferably the composition contains not more than 35 atomic % germanium, more preferably not more than 30 atomic % germanium and especially not more than 25 atomic % germanium. Also the composition preferably contains at least 20 atomic % selenium and especially at least 30 atomic % selenium but preferably not more than 70 atomic % selenium and especially not more than 60 atomic % selenium. The composition preferably contains at least 20 atomic % arsenic and especially at least 25 atomic % arsenic, but preferably not more than 60 atomic % arsenic and especially not more than 55 atomic % arsenic. Thus the composition preferably comprises:
(a) 20 to 70 atomic % selenium;
(b) 20 to 60 atomic % arsenic, and
(c) 5 to 30 atomic % germanium and most preferably comprises:
(a) 30 to 60 atomic % selenium;
(b) 25 to 55 atomic % arsenic; and
(c) 5 to 25 atomic % germanium.

All the proportions of the components (a), (b) and (c) are based on the total molar quantity of (a), (b) and (c) alone and total 100%.

It is possible for quantities e.g. up to 10% or sometimes more, of other materials to be present in the compositions used in the devices according to the invention, for example minor amounts of the elements antimony, bismuth, silicon, tin, lead, halogens and some transition metals provided that the presence of such materials does not deleteriously affect the properties, such as the energy to latch and/or off resistivity, to a significant degree. It is preferred, however, for the compositions to contain substantially no tellurium since the presence of tellurium has been found to reduce the off resistivity of the materials severely, although, in certain circumstances, small quantities of tellurium may be tolerated, e.g. up to 10 atomic %, but preferably less than 5 atomic %.

The switching element is usually formed by a vapour deposition method in which a vapour of the appropriate composition is deposited onto one of the electrodes. The vapour may be generated by heating an appropriate mixture of the components (not necessarily having the same composition as the intended glass) or the separate components may simultaneously be heated.

Preferably all the switching elements have substantially the same chemical composition since there is no advantage in any switching element intentionally having different properties from the rest. However, the electrical properties of the switches can vary significantly even though they have identical or very similar compositions, and it is preferably for the threshold voltage range, that is to say, the difference between the highest threshold voltage of any of the switching elements and the lowest threshold voltage, to be not more than 80 V, more preferably not more than 60 V and especially not more than 40 V. The narrower the threshold voltage range is the slower rise time of the transient can be while ensuring that all the switching elements will switch. However, in practice there is little, if any, advantage in ensuring that the threshold voltage range is too narrow, and so the threshold voltage range may be, for example, at least 5 V and especially at least 10 V.

The individual switching elements preferably have an energy to latch, as defined in our copending European application, of at least 40 mJ and, in addition or alternatively, a current carrying capacity of at least 20 amps, and especially at least 50 amps. The arrangement as a whole preferably has a current carrying capacity of at least 200 amps more preferably at least 500 amps, and especially at least 1000 amps per line. This will normally be achieved by employing at least 4 switching elements, preferably at least 6 switching elements and especially at least 8 switching elements per line. Preferably, however, the arrangement does not employ more than 50 switching elements, more preferably no more than 40 elements and especially no more than 30 elements. Since the current passing through any individual element will be smaller as the number of elements is increased, and the time taken before fold back will depend to some extent on the current passing through the switching element, it is believed that a large number of switching elements may delay folding back of the arrangement to such an extent that damaging levels of energy may pass into the electrical system to be protected.

Although a voltage transient experienced by the arrangement according to the invention will often cause all the switching elements to switch to their low resistance state, this need not always be the case. The rate of rise of the voltage transient caused by the EMP from a nuclear detonation will depend on a number of factors including the distance of the device from the line of the circuit, the orientation of the line to the explosion, the length of the line in which the transient current is induced and the system impedance. In view of this a maximum size of transient may be identified and the device be arranged so that all the switching elements will switch only when a transient of such a size is experienced, and that when other, smaller, transients are experienced the number of switches that switch will increase in accordance with the severity of the transient. In addition, as will be appreciated, it is always possible to ensure that not all the switching elements will switch by incorporating additional dummy switching elements of substantially higher threshold voltages. Such arrangements are considered within the scope of the invention.

It is believed that each switch used in the arrangements described above can only form a single filament because of migration of the charge traps toward the filament and the consequential depletion of the surrounding area. In view of this it is believed that in certain forms of switching element, for example switching elements that were long and narrow having a length in the order of 2 to 10 cm or more, different parts of the element would effectively act as separate switches, and a number of conductive filaments could be formed. Thus, according to another aspect, the invention provides an arrangement for protecting an electrical circuit from a voltage transient having a fast rise time, which comprises a threshold switching element that is connected, or arranged to be connected, between a current carrying line of the circuit, the switching element being such that, when the circuit is subjected to the voltage transient, a plurality of separate conductive filaments are formed in parallel with one another through the switching element.

The arrangements according to the invention may be used alone to protect an electrical circuit if the only anticipated threat is one having a fast rise time. However, electrical circuits are often subject to more than one threat, for example the circuit may need protection from lightning in addition to EMP protection. Preferably, therefore, the arrangements includes an additional circuit protection device in parallel with the threshold switching elements for protecting the circuit from other voltage transients. Preferably the additional circuit protection device comprises a spark gap, and especially one having an insertion loss of less than 2 dB at 100 Mz.

BRIEF DESCRIPTION OF THE DRAWINGS

An embodiment of the present invention will now be described by way of example with reference to FIGS. 1 to 7 of the accompanying drawings, in which.

DESCRIPTION OF THE DRAWINGS

Figure 1:
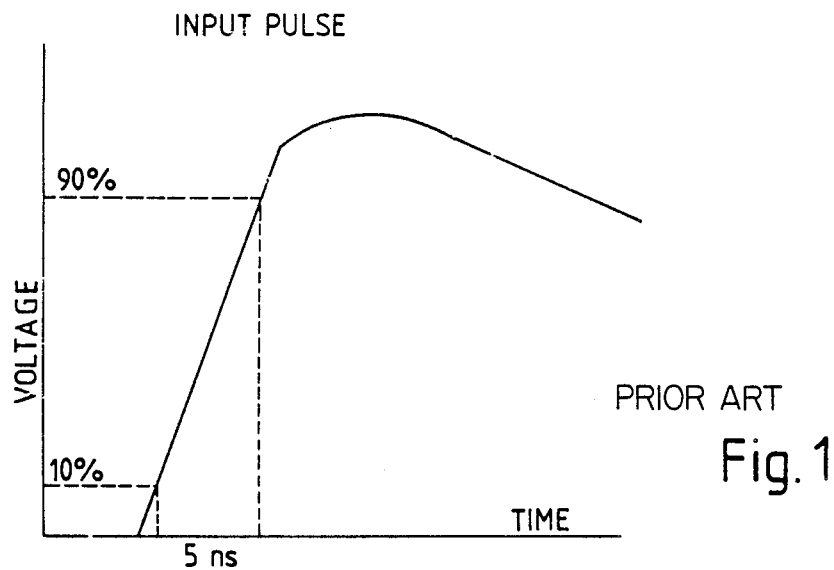
FIGS. 1 and 2 are waveforms of the prior art.
Figure 2:
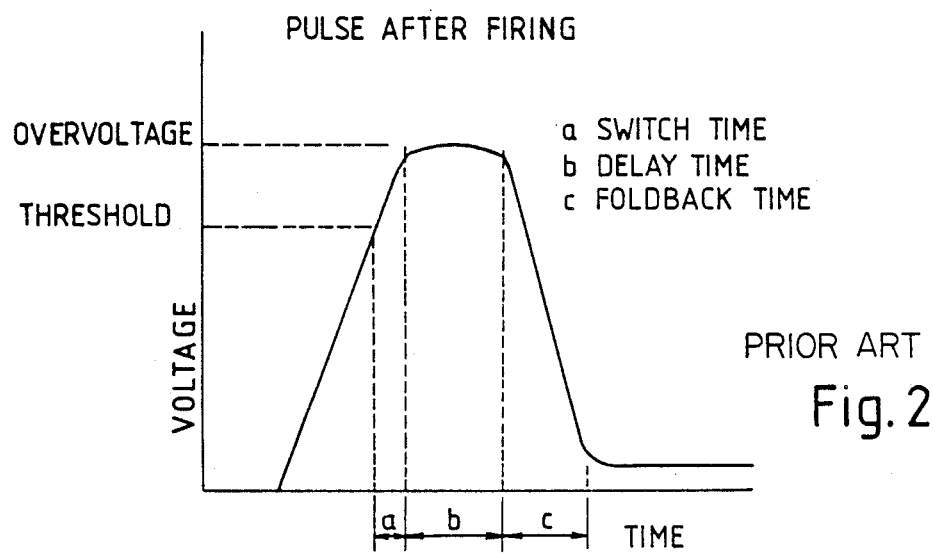
Figure 3:
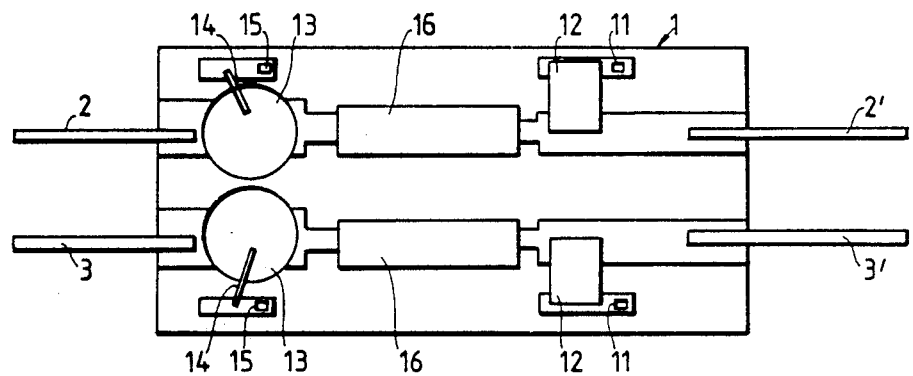
FIG. 3 is a top plan view of a circuit protection board in accordance with the present invention.
Figure 4:
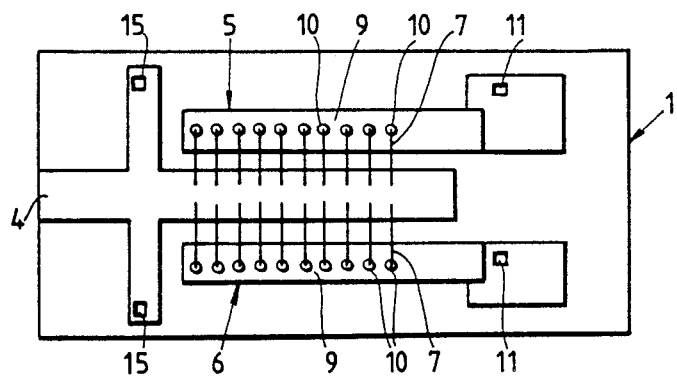
FIG. 4 is a plan view of the opposite side of the board shown in FIG. 3.
Figure 5:
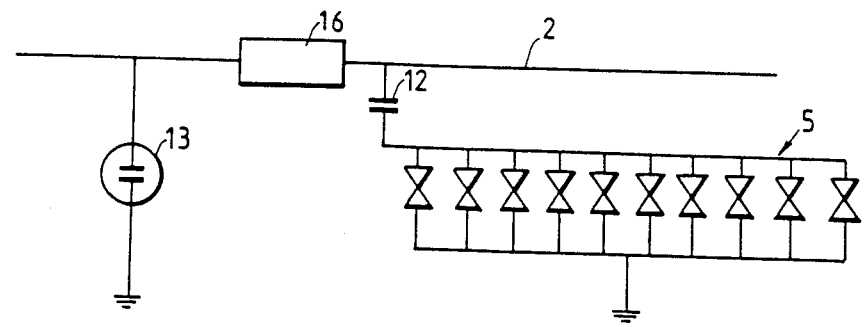
FIG. 5 is a circuit diagram of the circuit protection board shown in FIGS. 3 and 4.

Referring to FIGS. 3 to 5 of the accompanying drawings, an arrangement for protecting a pair of long lines comprises a board 1 of 50 mm length and 25 mm width which carries a pair of input terminals 2 and 3 for connection to a pair of lines, and a pair of output terminals 2' and 3' for connection to the equipment associated with the lines. On the other side of the board, a lead 4 is provided for connection to earth. The board carries two banks 5 and 6 of chalcogenide glass switching elements, bank 5 being associated with line 2 and bank 6 being associated with line 3. Each bank has a lower copper electrode and a 10 micrometer thick vacuum deposited chalcogenide glass layer 9 which are common to all the switching elements of that bank. On top of the chalcogenide glass layer 9 each bank has ten individual evaporated gold electrodes 10 which define ten switches and which are wire bonded to the ground lead 4 with wires 7.

Each of the lower electrodes is connected to a through hole 11 that is itself connected to the output terminal 2' or 3'. A 5 microfarad capacitor 12 is connected in series with each bank of switches, between the switches and the output terminal 2' or 3' in order to prevent the switches latching in their low resistance state by the normal line voltage after the transient has passed and to protect the switches from transients caused by lightning.

In addition to the chalcogenide glass switches, a gas discharge tube or spark gap 13 is connected between each terminal 2 and 3 and the ground line 4 by means of a wire bond 14 and through hole 15 in order to protect the lines from slow rise time transients such as those associated with lightning.

Optionally an element 16 having a high resistance or inductance may be provided in the line system between the gas discharge unit 13 and the switch bank 5 or 6 in order to raise the line impedance.

Since only components having low capacitances are connected to the signal line in normal use, the insertion loss of the arrangement is low. The device illustrated may be used at frequencies of up to 100 MHz at which point the insertion loss is approximately 1 dB.

Figure 6:
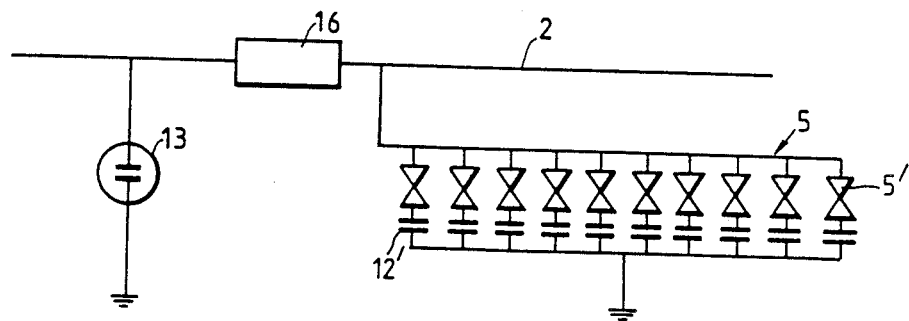
FIG. 6 is a circuit diagram of an alternative electrical circuit.
Figure 7:
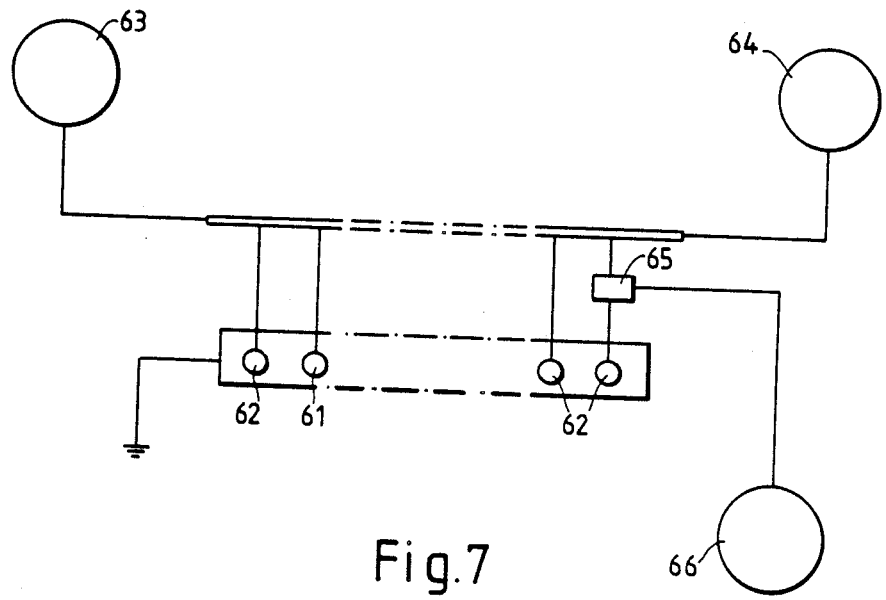
FIG. 7 is a circuit diagram showing a test circuit used in the Examples.

An alternative device is shown in FIG. 6. In this device a separate 0.5 microfarad capacitor 12' is connected in series with each switching element 5'.

The following Examples illustrate the invention:

EXAMPLE 1

A bank of ten chalcogenide glass switches were connected as shown in FIG. 6. The Bank of switches was formed by depositing a 10 micrometer thick glass composition layer 61 onto a common lower copper electrode and then depositing ten individual gold electrodes 62 to define ten switches. The glass composition and method of forming the switches was as described with respect to Example 7 of our copending U.S. application Ser. No. 845,652 (equivalent to European Application No. 86302325.5).

Thus, the glass composition was prepared by mixing the components, which were of at least 99.99% purity, and melting the mixture in a silica ampoule under a vacuum or under reduced argon pressure. During melting, which was carried out at temperatures of up to 1000° C. and for periods of up to 48 hours depending on the composition, the ampoule was rocked and rotated in order to ensure that a homogeneous melt was obtained. A 10 micrometer thick film of the glass so prepared was deposited onto a lower molybdenum electrode by vapour deposition at a pressure of $10^{-3}$ to $10^{-4}$ Pa using either a resistance heated, or an electron beam heated, source. Deposition rates of 0.3 to 1.0 micrometers per minute were employed. An upper molybdenum electrode of 1 mm$^2$ area was deposited by D.C. sputtering in argon at a pressure of 10 Pa and at a deposition rate of 20 to 30 micrometers per minute. The glass had a composition of 14 parts by mole Ge, 34 parts by mole As, and 52 parts by mole Se.

The switches were subjected to test pulses from a pulse generator 63 and the original pulse was detected by oscilloscope 64. In addition the current passing through each switching element was measured by means of a current probe 65 and oscilloscope 66.

The test pulses were double exponentials with a variable voltage up to 1000 volts. The pulse generator had a source impedance of 1 ohm giving a peak current of 1000 amps. The rate of rise could be varied from 200 volts a nanosecond to 20 volts a nanosecond and the voltage varied from 100 volts to 1000 volts.

The results are shown in table 1 from which it can be seen that when the initial pulse had a relatively slow rise time (16 Vns$^{-1}$ Run 1) only switch A switched to its low resistance state. However, when the rate of rise of the pulse increases, (Runs 2 and 3) the number of switches that switch increases to the extent that when the pulse leading edge rose by 64 Vns$^{-1}$ (Run 3) all the switches had switched and carried substantially the same current.

TABLE 1

| Run No. | 1 | 2 | 3 | 4 |
|---|---|---|---|---|
| pulse speed (Vns$^{-1}$) | 16 | 32 | 64 | 120 |
| switching element | Switching element current (amps) | | | |
| A | 100 | 40 | 28 | 75 |
| B | 0 | 37 | 34 | 80 |
| C | 0 | 23 | 38 | 64 |
| D | 0 | 31 | 54 | 82 |
| E | 0 | 29 | 50 | 90 |
| F | 0 | 29 | 20 | 75 |
| G | 0 | 9 | 44 | 50 |
| H | 0 | 2 | 48 | 68 |
| J | 0 | 0 | 38 | 90 |
| K | 0 | 0 | 40 | 92 |
| Total current (amps) | 100 | 200 | 400 | 750 |

We claim:

1. An arrangement for protecting an electrical circuit from a voltage transient having a fast rise time, which comprises a plurality of semiconductor threshold foldback switching elements that are connected, in parallel with one another between a current carrying line of the circuit and earth, and a capacitor connected in series with each switching element, the capacitor being connected between the switching element and the current carrying line.

2. An arrangement as claimed in claim 1, wherein the switching elements include a chalcogenide glass material.

3. An arrangement as claimed in claim 1, wherein the switching elements have substantially the same chemical composition.

4. An arrangement as claimed in claim 1, wherein individual switching elements of said plurality have an energy to latch of at least 40 mJ.

5. An arrangement as claimed in claim 1, wherein individual switching elements of said plurality have a current carrying capacity in their low resistance state of at least 50 amps.

6. An arrangement as claimed in claim 1, which has a current carrying capacity of at least 500 amps.

7. An arrangement as claimed in claim 1, wherein has at least 4 switching elements.

8. An arrangement as claimed in claim 1, which has not more than 20 switching elements.

9. An arrangement as claimed claim 1, wherein the switching elements have a latching time of not more than 1 nanosecond.

10. An arrangement as claimed in claim 1, wherein the switching elements have a delay time before fold back of from 1 to 5 nanoseconds.

11. An arrangement as claimed in claim 1, wherein the capacitor has a capacitance of not more than 10 microfarads.

12. An arrangement as claimed in claim 1, wherein a single capacitor is connected in series with all the switching elements.

13. An arrangement as claimed in claim 1, wherein the capacitor has a capacitance of up to 2 microfarads for each switching element.

14. An arrangement as claimed in claim 1, wherein a separate capacitor is connected to each switching element.